United States Patent
Sugimoto

(10) Patent No.: US 7,260,267 B2
(45) Date of Patent: Aug. 21, 2007

(54) IMAGE PROCESSING APPARATUS, COMPUTER READABLE MEDIUM STORING PROGRAM, IMAGE PROCESSING METHOD, IMAGE CAPTURING APPARATUS, PRINTING APPARATUS, AND SCANNING APPARATUS

(75) Inventor: Masahiko Sugimoto, Saitama (JP)

(73) Assignee: Fujifilm Corporation, Tokyo (JP)

( * ) Notice: Subject to any disclaimer, the term of this patent is extended or adjusted under 35 U.S.C. 154(b) by 725 days.

(21) Appl. No.: 10/368,369

(22) Filed: Feb. 20, 2003

(65) Prior Publication Data

US 2003/0179947 A1  Sep. 25, 2003

(30) Foreign Application Priority Data

Feb. 20, 2002  (JP)  ............................. 2002-044044

(51) Int. Cl.
*G06K 9/40*  (2006.01)
(52) U.S. Cl. ..................... 382/266; 348/222.1; 348/241
(58) Field of Classification Search ................ 382/167, 382/266; 348/222.1, 241, 254, 671, 674; 358/519
See application file for complete search history.

(56) References Cited

U.S. PATENT DOCUMENTS

| | | | | |
|---|---|---|---|---|
| 5,453,845 A | * | 9/1995 | Nonoshita et al. | 358/442 |
| 5,477,264 A | * | 12/1995 | Sarbadhikari et al. | 348/231.6 |
| 5,745,172 A | * | 4/1998 | Miyashita | 348/241 |
| 6,538,694 B1 | * | 3/2003 | Miyahara et al. | 348/241 |
| 6,965,389 B1 | * | 11/2005 | Masuji et al. | 345/690 |

FOREIGN PATENT DOCUMENTS

| | | |
|---|---|---|
| JP | 55-92083 A | 7/1980 |
| JP | 63-209373 A | 8/1988 |
| JP | 10-173958 A | 6/1998 |
| JP | 2001-346069 A | 12/2001 |

* cited by examiner

*Primary Examiner*—Bhavesh M Mehta
*Assistant Examiner*—Christopher Lavin
(74) *Attorney, Agent, or Firm*—Birch, Stewart, Kolasch & Birch, LLP

(57) ABSTRACT

An image processing apparatus for performing gamma correction and edge correction on the image and for generating a noiseless image. The image processing apparatus includes a gamma correction unit for performing gamma correction on the image; an edge extraction unit for extracting an edge portion of the image on which gamma correction is performed by said gamma correction unit; a correction coefficient generation unit for generating a correction coefficient based on gamma correction performed by said gamma correction unit; an edge-image generation unit for generating edge-image data by multiplying the correction coefficient to image data of the edge portion; and an adding unit for adding the edge-image data to the image data of the image on which gamma correction is performed by said gamma correction unit. The correction coefficient generation unit generates the correction coefficient based on an inverse of a differential coefficient of a gamma correction curve of the gamma correction at the brightness of each pixel for each of the pixel of the image. The correction coefficient generation unit replaces the correction coefficient with a predetermined value when the brightness of the pixel is larger than a predetermined threshold.

24 Claims, 5 Drawing Sheets

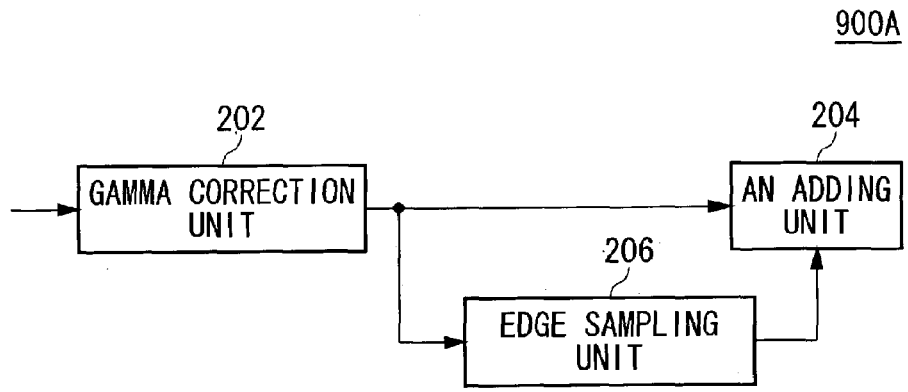
FIG. 1A  *PRIOR ART*
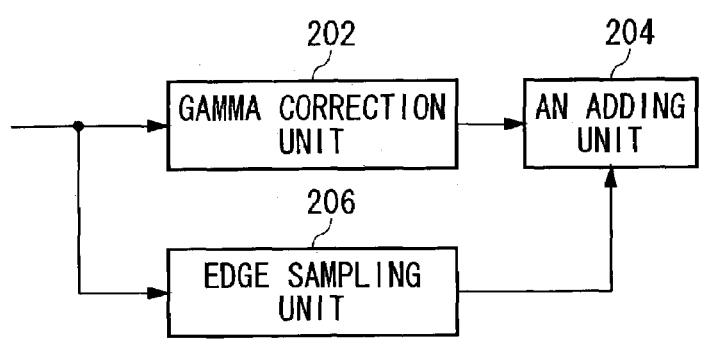
FIG. 1B  *PRIOR ART*
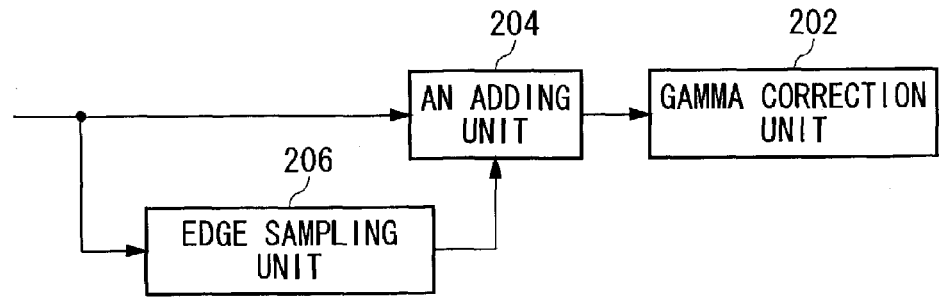
FIG. 1C  *PRIOR ART*

IMAGE PROCESSING APPARATUS, COMPUTER READABLE MEDIUM STORING PROGRAM, IMAGE PROCESSING METHOD, IMAGE CAPTURING APPARATUS, PRINTING APPARATUS, AND SCANNING APPARATUS

This patent application claims priority from a Japanese patent application No. 2002-044044 filed on Feb. 20, 2002, the contents of which are incorporated herein by reference.

BACKGROUND OF THE INVENTION

1. Field of the Invention

The present invention relates to an image processing apparatus, computer readable medium storing program, image processing method, image capturing apparatus, printing apparatus and scanning apparatus which perform image processing on images. More particularly, the present invention relates to the image processing apparatus, computer readable medium storing program, image processing method, image capturing apparatus, printing apparatus and scanning apparatus which performs edge correction on the image.

2. Description of Related Art

Conventionally, when edge correction is performed on an image, the edge correction is performed on the image after gamma correction is performed on the image, or the edge correction is performed on the image before gamma correction is performed on the image. In such manners, there has been a problem that higher gain is applied on an area where signal level is low, and noise in the dark area of the image is greatly conspicuous. Moreover, since the gain is uniformly applied on the image, result of the edge correction is not satisfactory in a bright area of the image.

Conventionally for example, a Japanese patent application publication No. 55-92083 discloses an edge compensation circuit and a Japanese patent application publication No. 63-209373 discloses a video signal processing circuit as image processing apparatuses. In the disclosed edge compensation circuit, edge correction signal is generated based on image signal before gamma correction, and edge compensation is performed by superimposing the edge correction signal on the image signal after gamma correction. The disclosed video signal processing circuit includes an edge correction means for performing edge correction to an input video signal, a gamma correction means for performing gamma correction to the input video signal, and an adding means for adding an output video signal from the edge correction means and an output video signal from the gamma correction means.

However, in the disclosed edge compensation circuit, since the edge correction signal is generated based on the image after the gamma correction, there is a problem that the noise in dark area of the image is greatly conspicuous. Moreover, in the disclosed video signal processing circuit, there is a problem that level of the edge enhancement in bright area of the image becomes excessive.

SUMMARY OF THE INVENTION

Therefore, it is an object of the present invention to provide an image processing apparatus, computer readable medium storing program, image processing method, image capturing apparatus, printing apparatus and scanning apparatus which can solve the foregoing problems. The above and other objects can be achieved by combinations described in the independent claims. The dependent claims define further advantageous and exemplary combinations of the present invention.

According to the first aspect of the present invention, there is provided an image processing apparatus for performing image processing on an image. The image processing apparatus includes a gamma correction unit for performing gamma correction on the image; an edge extraction unit for extracting an edge portion of the image on which gamma correction is performed by the gamma correction unit; a correction coefficient generation unit for generating a correction coefficient based on gamma correction performed by the gamma correction unit; an edge-image generation unit for generating edge-image data by multiplying the correction coefficient to image data of the edge portion; and an adding unit for adding the edge-image data to the image data of the image on which gamma correction is performed by the gamma correction unit.

It is preferable that the correction coefficient generation unit generates the correction coefficient for each of the pixel of the image based on an inverse of a differential coefficient of a gamma correction curve of the gamma correction at the brightness of each pixel. The correction coefficient generation unit may replace the correction coefficient with a predetermined value when the brightness of the pixel is larger than a predetermined threshold.

Moreover, The correction coefficient generation unit may replace the correction coefficient with a predetermined value when the generated correction coefficient is larger than a predetermined threshold. Moreover, The correction coefficient generation unit may replace the correction coefficient with a predetermined value when the gamma correction value is larger than a predetermined threshold.

According to the second aspect of the present invention, there is provided a computer readable medium storing program for allowing a computer to perform image processing on an image. The program includes a gamma correction module for allowing the image processing apparatus to perform gamma correction on the image; an edge extraction module for allowing the image processing apparatus to extract an edge portion of the image on which gamma correction is performed by the gamma correction module; a correction coefficient generation module for allowing the image processing apparatus to generate a correction coefficient based on gamma correction performed by the gamma correction module; an edge-image generation module for allowing the image processing apparatus to generate edge-image data by multiplying the correction coefficient to image data of the edge portion; and an adding module for allowing the image processing apparatus to add the edge-image data to the image data of the image on which gamma correction is performed by the gamma correction module.

The correction coefficient generation module may allow the image processing apparatus to generate the correction coefficient for each of the pixel of the image based on an inverse of a differential coefficient of a gamma correction curve of the gamma correction at the brightness of each pixel. The correction coefficient generation unit may allow the image processing apparatus to replace the correction coefficient with a predetermined value when the brightness of the pixel is larger than a predetermined threshold.

According to the third aspect of the present invention, there is provided an image processing method for performing image processing on an image. The image processing method includes steps of performing gamma correction on the image; extracting an edge portion of the image on which gamma correction is performed in the gamma correction step; generating a correction coefficient based on gamma correction performed in the gamma correction step; generating edge-image data by multiplying the correction coefficient to image data of the edge portion; and adding the edge-image data to the image data of the image on which gamma correction is performed in the gamma correction step.

The correction coefficient generation step may generate the correction coefficient for each of the pixel of the image based on an inverse of a differential coefficient of a gamma correction curve of the gamma correction at the brightness of each pixel. The correction coefficient generation step may replace the correction coefficient with a predetermined value when the brightness of the pixel is larger than a predetermined threshold.

According to the fourth aspect of the present invention, there is provided an image capturing apparatus for capturing a subject image. The image capturing apparatus includes an image pick-up unit for capturing an image of a subject; a gamma correction unit for performing gamma correction on the image; an edge extraction unit for extracting an edge portion of the image on which gamma correction is performed by the gamma correction unit; a correction coefficient generation unit for generating a correction coefficient based on gamma correction performed by the gamma correction unit; an edge-image generation unit for generating edge-image data by multiplying the correction coefficient to image data of the edge portion; and an adding unit for adding the edge-image data to the image data of the image on which gamma correction is performed by the gamma correction unit.

The image capturing apparatus may further include a printing unit for printing an image outputted from the adding unit.

The correction coefficient generation unit may generate the correction coefficient for each of the pixel of the image based on an inverse of a differential coefficient of a gamma correction curve of the gamma correction at the brightness of each pixel. The correction coefficient generation unit may replace the correction coefficient with a predetermined value when the brightness of the pixel is larger than a predetermined threshold.

According to the fifth aspect of the present invention, there is provided a printing apparatus for printing a subject image. The printing apparatus includes a data receiving unit for receiving an image of a subject; a gamma correction unit for performing gamma correction on the image; an edge extraction unit for extracting an edge portion of the image on which gamma correction is performed by the gamma correction unit; a correction coefficient generation unit for generating a correction coefficient based on gamma correction performed by the gamma correction unit; an edge-image generation unit for generating edge-image data by multiplying the correction coefficient to image data of the edge portion; an adding unit for adding the edge-image data to the image data of the image on which gamma correction is performed by the gamma correction unit; and a printing unit for printing an image outputted from the adding unit.

The correction coefficient generation unit may generate the correction coefficient for each of the pixel of the image based on an inverse of a differential coefficient of a gamma correction curve of the gamma correction at the brightness of each pixel. The correction coefficient generation unit may replace the correction coefficient with a predetermined value when the brightness of the pixel is larger than a predetermined threshold.

According to the sixth aspect of the present invention, there is provided an image scanning apparatus for scanning a subject image. The scanning apparatus includes a data scanning unit for scanning an image of a subject; a gamma correction unit for performing gamma correction on the image; an edge extraction unit for extracting an edge portion of the image on which gamma correction is performed by the gamma correction unit; a correction coefficient generation unit for generating a correction coefficient based on gamma correction performed by the gamma correction unit; an edge-image generation unit for generating edge-image data by multiplying the correction coefficient to image data of the edge portion; an adding unit for adding the edge-image data to the image data of the image on which gamma correction is performed by the gamma correction unit; and an output unit for outputting an image data outputted from the adding unit.

The correction coefficient generation unit may generate the correction coefficient for each of the pixel of the image based on an inverse of a differential coefficient of a gamma correction curve of the gamma correction at the brightness of each pixel. The correction coefficient generation unit may replace the correction coefficient with a predetermined value when the brightness of the pixel is larger than a predetermined threshold.

The summary of the invention does not necessarily describe all necessary features of the present invention. The present invention may also be a sub-combination of the features described above.

BRIEF DESCRIPTION OF THE DRAWINGS

FIGS. 1A, 1B and 1C are block diagrams showing examples of configuration of conventional image processing apparatus.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

FIGS. 1A, 1B and 1C are block diagrams showing examples of configuration of conventional image processing apparatuses 900A, 900B and 900C. Each of the image processing apparatuses 900A, 900B and 900C shown in FIGS. 1A, 1B, and 1C includes a gamma correction unit 202, an edge sampling unit 206, and an adding unit 204. The image processing apparatus 900A shown in FIG. 1A extracts edge data from image data on which gamma correction is performed. Moreover, the extracted edge data is added to the image data on which gamma correction is performed.

The image processing apparatus 900B shown in FIG. 1B extracts edge data from an unprocessed image data. Then the extracted edge data is added to the image data on which gamma correction is performed.

The image processing apparatus 900C shown in FIG. 1C performs edge correction by extracting edge data from an unprocessed image data and adding the edge data to the unprocessed data. Then, gamma correction is performed on the image data on which edge correction is performed.

Figure 2:
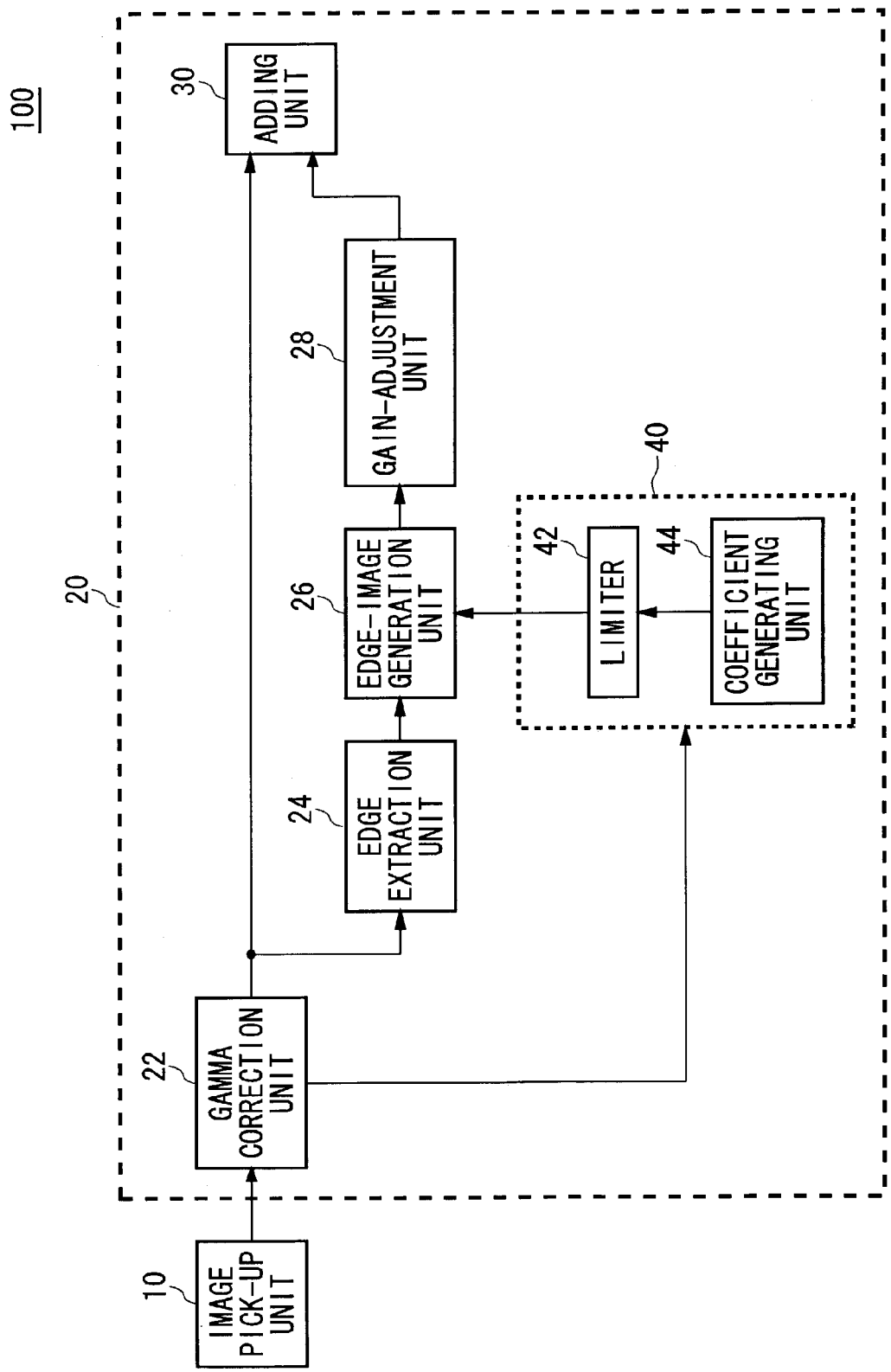
FIG. 2 is a block diagram showing an example of configuration of an image capturing apparatus including an image processing apparatus according to the present invention.

FIG. 2 is a block diagram showing an example of configuration of an image capturing apparatus 100 including an image processing apparatus 20 according to the present invention. For example, the image capturing apparatus 100 may be a digital still camera which photographs a still image, and may be a digital camcorder which takes movies. The image capturing apparatus 100 includes an image pick-up unit 10 and the image processing apparatus 20. The image pick-up unit 10 captures an image of a subject, and transmits the captured image to the image processing apparatus 20.

The image processing apparatus 20 performs image processing on an image. The image processing apparatus 20 includes a gamma correction unit 22, an edge extraction unit 24, a correction coefficient generation unit 40, an edge-image generation unit 26, a gain-adjustment unit 28, and an adding unit 30.

The gamma correction unit 22 performs gamma correction on the image. The gamma correction unit 22 converts brightness of each pixel of the image into a predetermined value based on the brightness of the unprocessed image. Alternatively, the gamma correction unit 22 has a desired gamma correction curve, where the gamma correction curve indicates the relation between the value inputted into the gamma correction unit 22, and the value outputted from the gamma correction unit 22.

Alternatively, the gamma correction unit 22 includes a table which associates and stores the brightness of a pixel, and a gamma correction value corresponding to brightness of each of the pixel. In this case, the gamma correction unit 22 outputs the gamma correction value corresponding to the brightness of each of the pixel. Alternatively, the gamma correction unit 22 includes a formula indicating relation between the brightness of a pixel and the gamma correction value. In this case, the gamma correction unit 22 outputs the gamma correction value based on the formula and the brightness of the pixel.

The edge extraction unit 24 extracts edge portion of the image on which gamma correction is performed. The edge extraction unit 24 may include a filter. For example, the filter extracts the edge portion of the image, on which gamma correction is performed, by extracting a portion of which a spatial frequency is lower than a predetermined value.

The correction coefficient generation unit 40 generates the correction coefficient for each of the pixel of the image based on the gamma correction. The correction coefficient generation unit 40 includes a limiter 42 and a coefficient generating unit 44. The correction coefficient generation unit 40 generates a correction coefficient for each pixel of the image based on an inverse of a differential coefficient of the gamma correction curve at the brightness of each of the pixel used by the gamma correction. In this example, the coefficient generating unit 44 generates the inverse of the differential coefficient of the gamma correction curve of the gamma correction at the brightness of each of the pixel for each of the pixel of the image, and the limiter 42 limits the inverse of the differential coefficient generated by the coefficient generating unit 44 and outputs it as a correction coefficient.

The coefficient generating unit 44 receives the gamma correction value for each of the pixel of the image, and generates the inverse of the differential coefficient of the gamma correction curve for each of the pixel of the image based on the gamma correction value. For example, the coefficient generating unit 44 includes memory which associates and stores the gamma correction value and the inverse of the differential coefficient of the gamma correction curve. Moreover, the coefficient generating unit 44 includes a formula indicating relation between the gamma correction value and the inverse of the differential coefficient of the gamma correction curve.

The coefficient generating unit 44 receives the brightness of each of the pixel of the image, and generates the inverse of the differential coefficient of the gamma correction curve for each of the pixel of the image based on the brightness. For example, the coefficient generating unit 44 includes memory which associates and stores the brightness of the pixel and the inverse of the differential coefficient of the gamma correction curve. Moreover, the coefficient generating unit 44 includes a formula indicating relation between the gamma correction value and the inverse of the differential coefficient of the gamma correction curve.

When the brightness of a corresponding pixel is larger than a predetermined threshold, the limiter 42 replaces the inverse of the differential coefficient of the gamma correction curve generated by the coefficient generating unit 44 with a predetermined value and output the predetermined value. On the other hand, the limiter 42 outputs the inverse of the differential coefficient of the gamma correction curve generated by the coefficient generating unit 44 when the corresponding brightness of the pixel is below the predetermined threshold. The correction coefficient generation unit 40 outputs the value outputted from the limiter 42 as a correction coefficient for the corresponding pixel.

Moreover, when the inverse of the differential coefficient of the gamma correction curve generated by the coefficient generating unit 44 is larger than a predetermined threshold, the limiter 42 replaces the inverse of the differential coefficient of the gamma correction curve generated by the coefficient generating unit 44 with a predetermined value and output the predetermined value. On the other hand, the limiter 42 outputs the inverse of the differential coefficient of the gamma correction curve generated by the coefficient generating unit 44 when the inverse of the differential coefficient of the gamma correction curve generated by the coefficient generating unit 44 is below the predetermined threshold.

Moreover, when the gamma correction value in gamma correction to a corresponding pixel is larger than a predetermined threshold, the limiter 42 replaces the inverse of the differential coefficient of the gamma correction curve generated by the coefficient generating unit 44 with a predetermined value. On the other hand, the limiter 42 outputs the inverse of the differential coefficient of the gamma correction curve generated by the coefficient generating unit 44 when the gamma correction value in gamma correction to the corresponding pixel is below the predetermined threshold.

The edge-image generation unit 26 generates edge-image data which is generated by multiplying each pixel data of the image of the edge portion extracted by the edge extraction unit 24, by the correction coefficient corresponding to each of the pixel data. The edge-image generation unit 26 may include a multiplier. The gain-adjustment unit 28 multiplies the edge-image data by a desired coefficient. The gain-adjustment unit 28 multiplies each of the pixel data of the edge image data by a predetermined coefficient, and adjusts gain of the edge-image data.

The adding unit 30 adds the edge-image data to the image data of the image on which the gamma correction is performed by the gamma correction unit 22. The adding unit 30 adds the data of each of the pixel of the image data, on which the gamma correction is performed, to the data of each of the corresponding pixel of the edge-image data.

Figure 3:
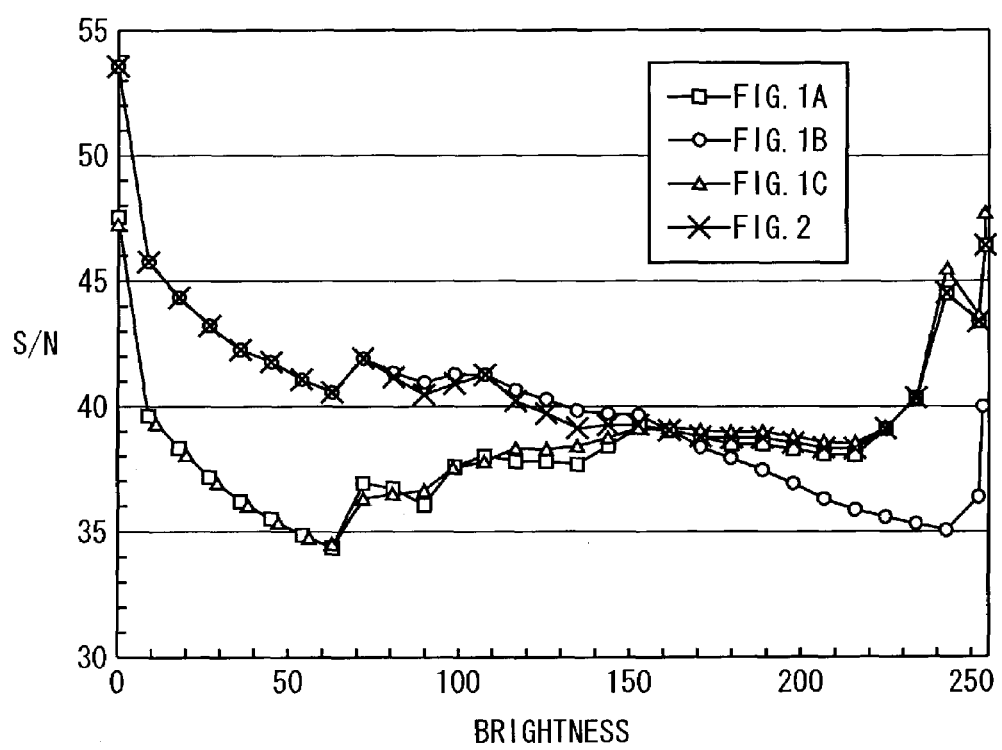
FIG. 3 is a graphical representation showing an example of characteristics of the image processing apparatus.

FIG. 3 is a graphical representation showing an example of characteristics of the image processing apparatus. FIG. 3 indicates characteristics of the image processing apparatuses 900A, 900B and 900C explained in FIGS. 1A, 1B and 1C, and the image processing apparatus 20 explained in FIG. 2. In FIG. 3, a transverse axis represents brightness of the pixel of an image, and a longitudinal axis represents a S/N ratio of the image.

As shown in FIG. 3, the S/N ratio of the image is low at the pixel's brightness of about 60 when the image is processed by the image processing apparatuses 900A and 900C shown in FIG. 1A and FIG. 1C. For example, the image processing apparatus 900A shown in FIG. 1A generates an image with large noise in an area of a person's skin. Moreover, the S/N ratio of the image is low in high brightness area when the image is processed by the image processing apparatus 900B shown in FIG. 1B. Therefore, the image processing apparatus 900B shown in FIG. 1B generates an image with large noise in a high brightness area.

Moreover, since the image processing apparatus 900C shown in FIG. 1C performs gamma correction after the edge data is added, level of the edge correction becomes different depending on the brightness of the edge data. For this reason, such as a halo effect arises at the edge portion of the image, for example. Moreover, in the image processing apparatus 900B shown in FIG. 1B, since the edge data, which is extracted from the unprocessed image, is added to the image data on which the gamma correction is performed, the edge portion of the image is enhanced superfluously.

As shown in FIG. 3, as for the image processing apparatus 20 explained in FIG. 2, a higher S/N ratio is obtainable than the image processing apparatus 900B shown in FIG. 1B in the high brightness area, and also a higher S/N ratio is obtainable than the image processing apparatus 900A shown in FIG. 1A in the low brightness area.

The image processing apparatus 20 explained in FIG. 2 generates the image having a high S/N ratio in both of the brightness area where the S/N ratio of the image processed by the image processing apparatus 900B shown in FIG. 1B is low, and the other brightness area where the S/N ratio of the image processed by the image processing apparatus 900A shown in FIG. 1A is low, by switching whether the limiter 42 limits the inverse of the differential coefficient generated by the coefficient generating unit 44. In the example indicated in FIG. 3, the limiter 42 switches whether to limits the value at the brightness of about 150.

For this reason, the image processing apparatus 20 explained in FIG. 2 generates the image having a S/N ratio higher than that of the conventional image processing apparatus. Moreover, the image processing apparatus 20 explained in FIG. 2 reduces excessive enhancement of the edge portion of the image in the high brightness area. Moreover, the image processing apparatus 20 explained in FIG. 2 reduces the halo effect in the edge portion of the image.

Figure 4:
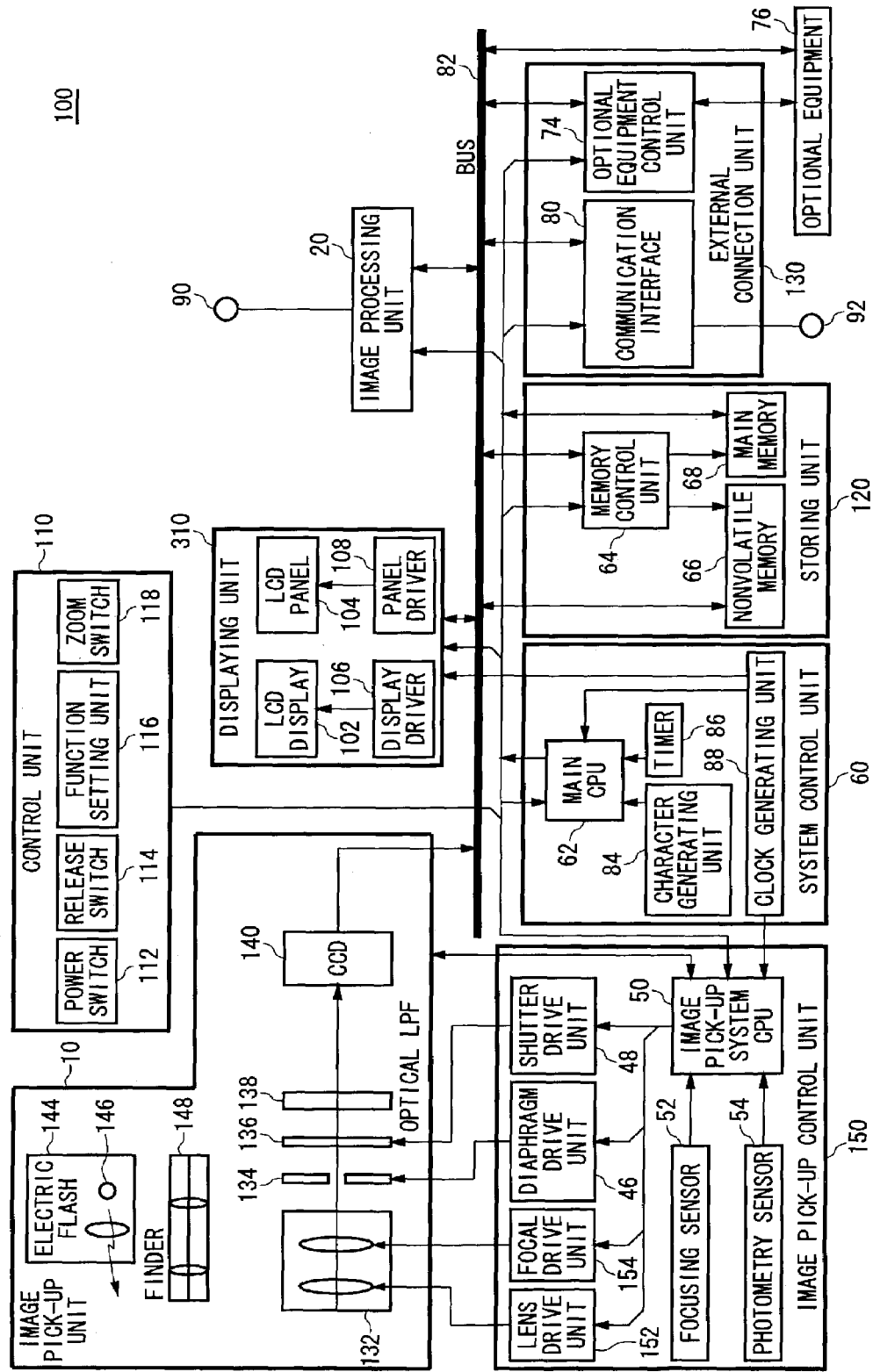
FIG. 4 is a block diagram showing an example of a detailed configuration of the image capturing apparatus.

FIG. 4 is a block diagram showing an example of a detailed configuration of the image capturing apparatus 100 according to the present embodiment. The image capturing apparatus 100 includes an image pick-up unit 10, an image pick-up control unit 150, a system control unit 60, a displaying unit 310, a control unit 110, a storing unit 120, an external connection unit 130, and the image processing apparatus 20. The image pick-up unit 10 and the image processing apparatus 20 have the same or similar function as/to that of the image pick-up unit 10 and the image processing apparatus 20 explained in reference to FIG. 2.

The image pick-up unit 10 includes a taking-lens unit 132, a diaphragm 134, a shutter 136, optical LPF 138 (low pass filter), CCD 140 (charge-coupled device), a finder 148, and an electric flash 144. The taking-lens unit 132 takes and processes a subject image. The taking-lens unit 132 includes a focal lens, a zoom lens, etc., and forms the image of the subject onto surface of the CCD 140. The diaphragm 134 limits the light which passed the taking-lens unit 132, and the optical LPF 138 passes light having longer wavelength component than a predetermined wavelength. Each sensor element of the CCD 140 stores charge according to quantity of light of the formed subject image (the charge is referred to as "stored charge" hereinafter).

The shutter 136 is a mechanical shutter and controls whether to form the image of the light onto the CCD 140, the light passing the taking-lens unit 132. The image capturing apparatus 100 may include an electronic shutter function instead of the mechanical shutter 136. In order to realize the electronic shutter function, the sensor element of the CCD 140 has a shutter gate and a shutter drain. The stored charge is discharged to the shutter drain by turning on the shutter gate. Time of storing the charge to each of the sensor, i.e., shutter speed, is controllable by controlling the shutter gate. In the CCD 140, the stored charge is read by a shift register by applying a readout gate pulse, and is read sequentially as a voltage signal by applying the register transfer pulse.

The finder 148 may include a displaying means and may display various information from below-mentioned main CPU 62, etc. The electric flash 144 includes a discharge tube 37, which discharges energy stored in a capacitor, and when the energy is supplied to the discharge tube 37, the electric flash 144 functions by the discharge tube 37 emitting light.

The image pick-up control unit 150 includes a lens drive unit 152, a focal drive unit 154, a diaphragm drive unit 46, a shutter drive unit 48, an image pick-up system CPU 50 which controls the drive units above, a focusing sensor 52, and a photometry sensor 54. The lens drive unit 152, the focal drive unit 154, the diaphragm drive unit 46, and the shutter drive unit 48 include driving means, such as a stepping motor, and drive mechanical components in the image pick-up unit 10. According to depression of a below-mentioned release switch 114, the focusing sensor 52 measures distance to the subject, and the photometry sensor 54 measures brightness of the subject. The focusing sensor 52 and the photometry sensor 54 supply focusing data and photometry data to the image pick-up system CPU 50, where the focusing data means the data of the measured distance to the subject, and the photometry data means the data of the measured brightness of the subject.

The image pick-up system CPU 50 controls the lens drive unit 152 and the focal drive unit 154, and adjusts a zoom magnification and a focus of the taking-lens unit 132 based on photography information, such as a zoom magnification directed by a user. Alternatively, the image pick-up system CPU 50 controls the lens drive unit 152 and the focal drive unit 154, and adjusts a zoom magnification and a focus based on the focusing data received from the focusing sensor 52 and/or the photometry data received from the photometry sensor 54.

The image pick-up system CPU 50 determines stop and shutter speed based on the photometry data received from the photometry sensor 54. The diaphragm drive unit 46 and the shutter drive unit 48 control the aperture size of the diaphragm 134, and the opening and closing of the shutter 136 according to the determined value.

The image pick-up system CPU 50 controls light emission of the electric flash 144 based on the photometry data received from the photometry sensor 54, and adjusts the aperture size of the diaphragm 134 simultaneously. When the user instructs to take an image, the CCD 140 starts to store the charge and outputs the electronic data based on the stored charge to the storing unit 120 or the image processing apparatus 20 after the shutter time calculated from the photometry data is elapsed. The image processing apparatus 20 performs the image processing explained in reference to FIG. 2 to the electronic data, and stores the processed image data in the storing unit 120.

The system control unit 60 includes main CPU 62, a character generating unit 84, a timer 86, and a clock generating unit 88. The main CPU 62 controls entire parts of the image capturing apparatus 100, especially the system control unit 60. The main CPU 62 sends and receives required information to/from the image pick-up systems CPU 50 by serial communication or the like. In the present embodiment, the main CPU 62 selects the image data stored in the storing unit 120 depending on an external device.

The clock generating unit 88 generates an internal clock of the main CPU 62, and supplies it to the main CPU 62. The clock generating unit 88 also generates internal clocks of the image pick-up system CPU 50 and the displaying unit 310. The clock generating unit 88 may supply the clocks having different frequencies to the main CPU 62, the image pick-up system CPU 50, and the displaying unit 310, respectively.

The character generating unit 84 generates text and graphic information, which is superimposed onto the photographed image, such as date/time or a title of the image. A timer 86 has backing of battery etc., counts time always, and supplies time information, such as information about the photographed date/time of the photographed image, to the main CPU 62 based on the counted value. It is preferable that the timer 86 counts time with the power supplied from the battery, even when main power supply of the digital camera is switched off. It is also preferable that the character generating unit 84 and the timer 86 are annexed to the main CPU 62.

The storing unit 120 includes a memory control unit 64, nonvolatile memory 66, and main memory 68. The memory control unit 64 controls the nonvolatile memory 66 and the main memory 68. The nonvolatile memory 66 is composed of EEPROM (electrically erasable programmable read only memory) or flash memories etc., and stores it with data which is to be held even when the power supply of the image capturing apparatus 100 is switched off, such as setting information set by a user or a factory preset value. The nonvolatile memory 66 may store a boot program, a system program, etc. of the main CPU 62.

It is preferable that the main memory 68 is composed of memory which is relatively inexpensive and has large capacity, like DRAM. The main memory 68 has a function as frame memory to store the data outputted from the image pick-up unit 10, a function as system memory which loads various programs, and a function as a work area. The nonvolatile memory 66 and the main memory 68 communicate with each part inside/outside the system control unit 60 through a bus 82. The nonvolatile memory 66 further stores the digital image data processed by the image processing apparatus 20.

The image processing apparatus 20 includes the same or similar function and configuration as/to those of the image processing apparatus 20 explained in reference to FIG. 2. In addition to the configuration of the image processing apparatus 20 explained in reference to FIG. 2, the image processing apparatus 20 includes a YC processing unit 70, an encoder 72, and a compression/decompression processing unit 78. The external connection unit 130 includes an optional equipment control unit 74 and a communication interface 80.

The YC processing unit 70 performs YC conversion to the digital image data, and generates a luminance signal Y, a color difference signals B-Y and R-Y. The gamma correction unit 22 explained in reference to FIG. 2 receives the luminance signal Y as image data, and the image processing apparatus 20 performs image processing explained in reference to FIG. 2 based on the luminance signal Y. The main memory 68 stores the luminance signal and the color difference signals based on control of the memory control unit 64. The main memory 68 stores the image data, to which the image processing explained in reference to FIG. 2 is performed by the image processing apparatus 20, as the luminance signal.

The compression/decompression processing unit 78 reads and compresses the luminance signal and the color difference signals sequentially from the main memory 68. Then the optional equipment control units 74 writes the compressed digital image data (referred to as "compressed data") in a memory card which is an example of the optional equipment 76.

The encoder 72 converts the luminance signal and the color difference signals into a video signal (NTSC or PAL signal), and outputs the video signal from a terminal 90. When generating the video signal from the compressed data recorded on the optional equipment 76, the compressed data is supplied to the compression/decompression processing unit 78 at first through the optional equipment control unit 74. Then, the data is decompressed in the compression/decompression processing unit 78 and the encoder 72 converts the decompressed data into the video signal.

The optional equipment control unit 74 performs generation, logical conversion, and/or voltage conversion of the signal that flows between the bus 82 and the optional equipment 76, in order to conform the signal to the specification of the optional equipment 76 and the bus 82.

Other than the above-mentioned memory card, the image capturing apparatus 100 may support a standard PCMCIA I/O card, for example, as the optional equipment 76. In this case, the optional equipment control unit 74 is composed of bus control LSI for PCMCIA standard or the like.

The communication interface 80 performs control such as protocol conversion to comply with the communication specification supported by the image capturing apparatus 100, e.g., USB, RS-232C, Ethernet, etc. The communication interface 80 outputs the compressed data or the digital image data to external equipment through a terminal 92. The communication interface 80 includes a driver IC if necessary and communicates with external equipment through the terminal 92. The communication interface 80 may communicate with the external equipment, such as a printer, a karaoke machine or a video game machine, through an original standard interface.

The displaying unit 310 includes an LCD display 102, an LCD panel 104, a display driver 106, and a panel driver 108.

The display driver 106 controls the LCD display 102. The panel driver 108 controls the LCD panel 104. The LCD display 102 is positioned on the back face of the camera, of which the size is about 2 inches for example, and displays an image currently photographed, a playback image, zoom magnification of the photographed or playback image, remaining battery charge, date/time, mode selection screen, a subject image, etc. The LCD panel 104 is a monochrome LCD, for example, is positioned on top face of the camera, and displays information, such as quality of the image (fine, normal, basic, etc.), flash mode (forced flash, suppressed flash, etc.), number of available frames, number of pixels, and remaining battery charge.

The control unit 110 includes a power switch 112, a release switch 114, a function setting unit 116, and a zoom switch 118. The power switch 112 switches the image capturing apparatus 100 on and off based on direction of a user. The release switch 114 can be depressed in two levels, i.e., halfway depression and full depression. For example, when the release switch 114 is depressed halfway, the image pick-up control unit 150 performs automatic focusing and automatic exposure, and the image pick-up unit 10 captures a subject image by depressing the release switch 114 fully.

The function setting unit 116 is, for example, a rotatable mode dial or a 4-direction button and accepts settings such as "file format", "special effect", "print", "determine/save", "change display", etc. The zoom switch 118 accepts setting of zoom magnification of the subject image picturized by the image pick-up unit 10.

The image capturing apparatus 100 having the above-mentioned structure operates in the following manner. First, the power switch 112 is depressed and power is supplied to each part of the image capturing apparatus 100. The main CPU 62 judges whether the image capturing apparatus 100 is in photography mode or in playback mode by reading status of the function setting unit 116.

When an image capturing apparatus 100 is in photography mode, the main CPU 62 supervises the depression status of the release switch 114. When the half-depression of the release switch 114 is detected, the image pick-up system CPU 50 acquires photometry data and focusing data from the photometry sensor 54 and the focusing sensor 52, respectively. The image pick-up control unit 150 adjusts focus and stop of the image pick-up unit 10, etc. based on the photometry data and the focusing data acquired by the image pick-up system CPU 50. After the adjustment, the LCD display 102 informs a user about the completion of the adjustment by displaying characters, such as "standby".

Then, the main CPU 62 supervises the depression status of the release switch 114. When the full-depression of the release switch 114 is detected, the shutter 136 is closed after a predetermined shutter time is elapsed and the stored charge of the CCD 140 is discharged to the image processing unit 20. The digital image data, generated as a result of processing by the image processing unit 20, is outputted to the bus 82. The digital image data is once stored in the main memory 68.

On the other hand, when the image capturing apparatus 100 is in playback mode, the main CPU 62 selects the image data in the storing unit 120 depending on an output unit to which the image data is to be outputted, and outputs the selected image data to the output unit. For example, the image data according to the characteristics of the LCD panel 104 is read from the nonvolatile memory 66, and it is displayed on the LCD display 102 of the displaying unit 310.

In this state, when a user directs either "move forward" or "move backward" on the function setting unit 116, the main CPU 62 reads another photographed image stored in the nonvolatile memory 66, and displays the image on the LCD panel 104 of the displaying unit 310.

In the present embodiment, although the image processing apparatus 20 is included in the image capturing apparatus 100, in other embodiments, the image processing apparatus 20 may be included in a computer for processing images, a printer which prints the image, or a scanner which reads the image.

Figure 5:
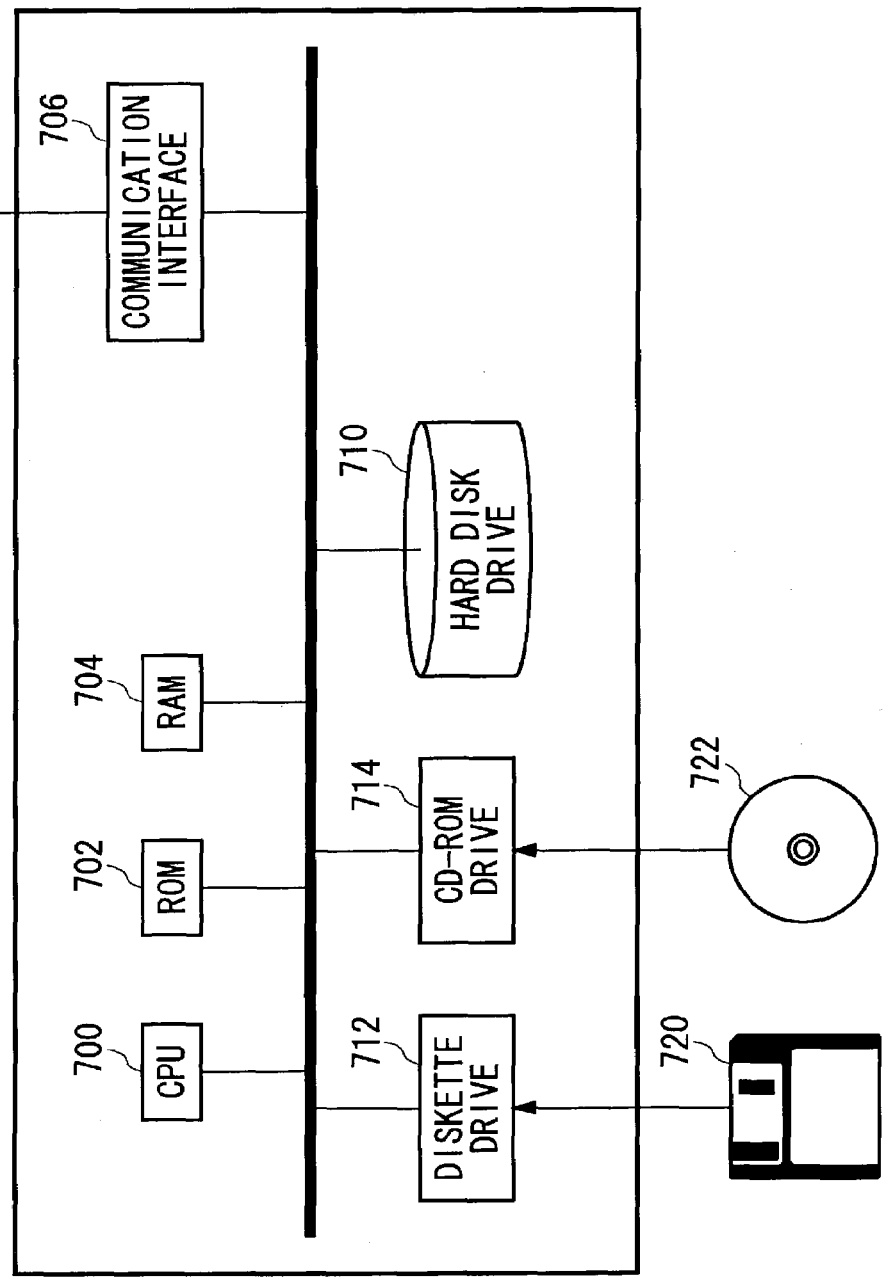
FIG. 5 is a block diagram showing an example of a hardware configuration of a computer as the image processing apparatus.

FIG. 5 is a block diagram showing an example of a hardware configuration of a computer 200, as an example of the image processing apparatus 20 according to the present embodiment. The computer 200 includes CPU 700, ROM 702, RAM 704, a communication interface 706, a hard disk drive 710, a diskette drive 712, and a CD-ROM drive 714. The CPU 700 operates based on a program stored in the ROM 702, the RAM 704, the hard disk drive 710, a diskette 720 and/or a CD-ROM 722.

The communication interface 706 communicates with outside through the Internet or the like. The hard disk drive 710, as an example of a storing device, stores setting information and a program with which the CPU 700 operates. The ROM 702, the RAM 704, and/or the hard disk drive 710 stores an image processing program for allowing the computer 200 to function as the image processing apparatus 20 in reference to FIG. 2.

The image processing program includes a gamma correction module for performing gamma correction on an image, an edge extraction module for extracting edge portion of the image on which gamma correction is performed, a correction coefficient generation module which generates the correction coefficient based on gamma correction processing, an edge-image generation module for generating an edge-image data by multiplying a correction coefficient to the image data of an edge portion, and an adding module for adding edge-image data to the image data of the image on which gamma correction is performed. For example, the image-processing program allows the CPU 700 to function as the gamma correction unit 22, the edge extraction unit 24, the edge-image generation unit 26, the gain-adjustment unit 28, the adding unit 30, and the correction coefficient generation unit 40, described in reference to FIG. 2.

The diskette drive 712 reads image data or a program in the diskette 720, and provides the image data or the program to the CPU 700. The CD-ROM drive 714 reads image data or a program in the CD-ROM 722, and provides the image data or the program to the CPU 700. The communication interface 706 connects with the Internet and transmits and receives the data.

The program executed by the CPU 700 is provided by a user, being stored in a record medium such as the diskette 720 or the CD-ROM 722. The program stored in the record medium may be either compressed or decompressed. The program is read from the record medium, installed in the hard disk drive 710, read by the RAM 704 and executed by the CPU 700.

The computer 200 receives the image, on which image processing is to be performed, from the CD-ROM 722 and/or the diskette 720. Alternatively, the image is received from outside through the communication interface. Alternatively, the computer 200 includes a means for reading the image from a storage medium in a digital camera which stores the image.

The image processing program may be read from the record medium by the RAM directly and executed, or the programs may be installed in the hard disk drive once and then be read by the RAM and executed. Furthermore, the programs may be stored in a single record medium or a plurality of record media. The image processing program stored in the record medium may provide each function in cooperation with an operating system. For example, the image processing program may request the operating system to do some or all functions, or the function may be provided based on the response from the operating system.

It is possible to use an optical record medium such as DVD or PD, a magneto-optical record medium such as Minidisk, a tape medium, a magnetic record medium or a semiconductor memory such as an IC card or a Miniature Card as a record medium instead of the diskette or the CD-ROM. A storage device, such as a hard disk or RAM in a server system on a dedicated communication network or the Internet, may be used as a record medium. As well as the image processing apparatus 20, according to the computer 200 of the present embodiment, gamma correction and edge correction are performed on an image and a noiseless image is generated.

As described above, according to the present invention, gamma correction and edge correction are performed on an image and a noiseless image is generated.

Although the present invention has been described by way of an exemplary embodiment, it should be understood that those skilled in the art might make many changes and substitutions without departing from the spirit and the scope of the present invention which is defined only by the appended claims.

What is claimed is:

1. An image processing apparatus for performing image processing on an image, comprising:
    a gamma correction unit for performing gamma correction on the image;
    an edge extraction unit for extracting an edge portion of the image on which gamma correction is performed by said gamma correction unit;
    a correction coefficient generation unit for generating a correction coefficient based on gamma correction performed by said gamma correction unit;
    an edge-image generation unit for generating edge-image data by multiplying the correction coefficient to image data of the edge portion; and
    an adding unit for adding the edge-image data to the image data of the image on which gamma correction is performed by said gamma correction unit.

2. The image processing apparatus as claimed in claim 1, wherein said correction coefficient generation unit generates the correction coefficient for each of the pixel of the image based on an inverse of a differential coefficient of a gamma correction curve of the gamma correction at the brightness of each pixel.

3. The image processing apparatus as claimed in claim 2, wherein said correction coefficient generation unit replaces the correction coefficient with a predetermined value when the brightness of the pixel is larger than a predetermined threshold.

4. The image processing apparatus as claimed in claim 2, wherein said correction coefficient generation unit replaces the correction coefficient with a predetermined value when the correction coefficient is larger than a predetermined threshold.

5. The image processing apparatus as claimed in claim 2, wherein said correction coefficient generation unit replaces the correction coefficient with a predetermined value when a gamma correction value generated by said gamma correction unit is larger than a predetermined threshold.

6. The image processing apparatus as claimed in claim 1, wherein said gamma correction performed by said gamma correction unit comprises brightness, and said correction coefficient generation unit receives the brightness of each pixel of the image, and generates an inverse of a differential coefficient of a gamma correction curve for each pixel of the image based on the brightness.

7. The image processing apparatus as claimed in claim 6, wherein said correction coefficient generation unit associates the brightness of the pixel with the inverse of the differential coefficient of the gamma correction curve and further comprises a memory which stores data representing the association.

8. The image processing apparatus as claimed in claim 7, wherein said correction coefficient generation unit includes a formula indicating a relation between a gamma correction value and the inverse of the differential coefficient of the gamma correction curve.

9. A computer readable medium storing thereon a program for an image processing apparatus which performs image processing on an image, the program comprising:
    a gamma correction module for allowing the image processing apparatus to perform gamma correction on the image;
    an edge extraction module for allowing the image processing apparatus to extract an edge portion of the image on which gamma correction is performed by said gamma correction module;
    a correction coefficient generation module for allowing the image processing apparatus to generate a correction coefficient based on gamma correction performed by said gamma correction module;
    an edge-image generation module for allowing the image processing apparatus to generate edge-image data by multiplying the correction coefficient to image data of the edge portion; and
    an adding module for allowing the image processing apparatus to add the edge-image data to the image data of the image on which gamma correction is performed by said gamma correction module.

10. The computer readable medium as claimed in claim 9, wherein said correction coefficient generation module allows the image processing apparatus to generate the correction coefficient for each of the pixel of the image based on an inverse of a differential coefficient of a gamma correction curve of the gamma correction at the brightness of each pixel.

11. The computer readable medium as claimed in claim 10, wherein said correction coefficient generation unit allows the image processing apparatus to replace the correction coefficient with a predetermined value when the brightness of the pixel is larger than a predetermined threshold.

12. An image processing method for performing image processing on an image, comprising steps of:
    performing gamma correction on the image;
    extracting an edge portion of the image on which gamma correction is performed in said gamma correction step;
    generating a correction coefficient based on gamma correction performed in said gamma correction step;
    generating edge-image data by multiplying the correction coefficient to image data of the edge portion; and
    adding the edge-image data to the image data of the image on which gamma correction is performed in said gamma correction step.

13. The image processing method as claimed in claim 12, wherein said correction coefficient generation step generates the correction coefficient for each of the pixel of the image based on an inverse of a differential coefficient of a gamma correction curve of the gamma correction at the brightness of each pixel.

14. The image processing method as claimed in claim 13, wherein said correction coefficient generation step replaces the correction coefficient with a predetermined value when the brightness of the pixel is larger than a predetermined threshold.

15. An image capturing apparatus for capturing a subject image, comprising:
   an image pick-up unit for capturing an image of a subject;
   a gamma correction unit for performing gamma correction on the image;
   an edge extraction unit for extracting an edge portion of the image on which gamma correction is performed by said gamma correction unit;
   a correction coefficient generation unit for generating a correction coefficient based on gamma correction performed by said gamma correction unit;
   an edge-image generation unit for generating edge-image data by multiplying the correction coefficient to image data of the edge portion; and
   an adding unit for adding the edge-image data to the image data of the image on which gamma correction is performed by said gamma correction unit.

16. The image capturing apparatus as claimed in claim 15, further comprising a printing unit for printing an image outputted from said adding unit.

17. The image capturing apparatus as claimed in claim 15, wherein said correction coefficient generation unit generates the correction coefficient for each of the pixel of the image based on an inverse of a differential coefficient of a gamma correction curve of the gamma correction at the brightness of each pixel.

18. The image capturing apparatus as claimed in claim 17, wherein said correction coefficient generation unit replaces the correction coefficient with a predetermined value when the brightness of the pixel is larger than a predetermined threshold.

19. A printing apparatus for printing a subject image, comprising:
   a data receiving unit for receiving an image of a subject;
   a gamma correction unit for performing gamma correction on the image;
   an edge extraction unit for extracting an edge portion of the image on which gamma correction is performed by said gamma correction unit;
   a correction coefficient generation unit for generating a correction coefficient based on gamma correction performed by said gamma correction unit;
   an edge-image generation unit for generating edge-image data by multiplying the correction coefficient to image data of the edge portion;
   an adding unit for adding the edge-image data to the image data of the image on which gamma correction is performed by said gamma correction unit; and
   a printing unit for printing an image outputted from said adding unit.

20. The printing apparatus as claimed in claim 19, wherein said correction coefficient generation unit generates the correction coefficient for each of the pixel of the image based on an inverse of a differential coefficient of a gamma correction curve of the gamma correction at the brightness of each pixel.

21. The printing apparatus as claimed in claim 20, wherein said correction coefficient generation unit replaces the correction coefficient with a predetermined value when the brightness of the pixel is larger than a predetermined threshold.

22. An image scanning apparatus for scanning a subject image, comprising:
   a data scanning unit for scanning an image of a subject;
   a gamma correction unit for performing gamma correction on the image;
   an edge extraction unit for extracting an edge portion of the image on which gamma correction is performed by said gamma correction unit;
   a correction coefficient generation unit for generating a correction coefficient based on gamma correction performed by said gamma correction unit;
   an edge-image generation unit for generating edge-image data by multiplying the correction coefficient to image data of the edge portion;
   an adding unit for adding the edge-image data to the image data of the image on which gamma correction is performed by said gamma correction unit; and
   an output unit for outputting an image data outputted from said adding unit.

23. The image scanning apparatus as claimed in claim 22, wherein said correction coefficient generation unit generates the correction coefficient for each of the pixel of the image based on an inverse of a differential coefficient of a gamma correction curve of the gamma correction at the brightness of each pixel.

24. The image scanning apparatus as claimed in claim 23, wherein said correction coefficient generation unit replaces the correction coefficient with a predetermined value when the brightness of the pixel is larger than a predetermined threshold.

* * * * *